US012013653B2

(12) United States Patent
Takahashi et al.

(10) Patent No.: US 12,013,653 B2
(45) Date of Patent: Jun. 18, 2024

(54) IMAGE FORMING APPARATUS

(71) Applicant: CANON KABUSHIKI KAISHA, Tokyo (JP)

(72) Inventors: Hiroyuki Takahashi, Chiba (JP); Sho Matsui, Chiba (JP); Ayano Ogata, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/177,312

(22) Filed: Mar. 2, 2023

(65) Prior Publication Data

US 2023/0297013 A1 Sep. 21, 2023

(30) Foreign Application Priority Data

Mar. 16, 2022 (JP) ................................ 2022-041687

(51) Int. Cl.

*G03G 15/20* (2006.01)
*G03G 15/00* (2006.01)
*G03G 15/01* (2006.01)

(52) U.S. Cl.

CPC ....... *G03G 15/205* (2013.01); *G03G 15/0131* (2013.01); *G03G 15/5008* (2013.01); *G03G 15/6529* (2013.01); *G03G 15/657* (2013.01); *G03G 2215/00126* (2013.01); *G03G 2215/2038* (2013.01)

(58) Field of Classification Search

CPC ............ G03G 15/205; G03G 15/0131; G03G 15/5008; G03G 2215/00126; G03G 2215/2038; G03G 15/657; G03G 15/6529; G03G 15/5004

See application file for complete search history.

(56) References Cited

U.S. PATENT DOCUMENTS

| | | | | |
|---|---|---|---|---|
| 2012/0087687 A1* | 4/2012 | Moteki | ................ | G03G 15/657 399/68 |
| 2021/0364955 A1* | 11/2021 | Iwasaki | .............. | G03G 15/6529 |
| 2021/0364970 A1* | 11/2021 | Sato | ..................... | G03G 15/657 |

FOREIGN PATENT DOCUMENTS

| | | |
|---|---|---|
| JP | 2012083416 A | 4/2012 |

* cited by examiner

*Primary Examiner* — Sandra Brase
(74) *Attorney, Agent, or Firm* — ROSSI, KIMMS & McDOWELL LLP

(57) ABSTRACT

An image forming apparatus includes a transfer portion, a fixing unit, a conveyance belt configured to convey a sheet from the transfer portion toward the fixing unit, a driving portion configured to drive the conveyance belt, and a controller configured to control the driving portion. The controller is configured to, in a case of switching the image forming apparatus to a standby state in which the image forming apparatus is ready to start an image forming operation and stands by for input of an image forming job, execute preheating in which the fixing unit is preliminarily heated, and cause the driving portion to rotate the conveyance belt while the preheating is executed.

20 Claims, 10 Drawing Sheets

IMAGE FORMING APPARATUS

BACKGROUND OF THE INVENTION

Field of the Invention

The present invention relates to an image forming apparatus that forms an image on a recording material.

Description of the Related Art

Japanese Patent Laid-Open No. 2012-83416 discloses a conveyance belt that conveys a recording material onto which a toner image has been transferred in a transfer portion to a fixing unit in an image forming apparatus of an electrophotographic system.

Preliminarily heating a fixing unit to shorten a waiting time (first print-out time: FPOT) between input of an image forming job and output of the first product is known. However, when the surface temperature of the conveyance belt of the above-described document is locally raised by radiant heat from the heated fixing unit, there is a possibility that the gloss of an image becomes uneven due to a temperature difference in the peripheral direction of the conveyance belt when the image forming job is executed.

SUMMARY OF THE INVENTION

The present invention provides an image forming apparatus in which occurrence of gloss unevenness can be reduced.

According to one aspect of the invention, an image forming apparatus includes a transfer portion configured to transfer a toner image onto a sheet, a fixing unit configured to heat the toner image transferred onto the sheet to fix the toner image to the sheet, a conveyance belt configured to convey the sheet from the transfer portion toward the fixing unit, a driving portion configured to drive the conveyance belt, and a controller configured to control the driving portion, wherein the controller is configured to in a case of switching the image forming apparatus to a standby state in which the image forming apparatus is ready to start an image forming operation and stands by for input of an image forming job, execute preheating in which the fixing unit is preliminarily heated, and cause the driving portion to rotate the conveyance belt while the preheating is executed.

According to another aspect of the invention, an image forming apparatus includes a transfer portion configured to transfer a toner image onto a sheet, a fixing unit configured to heat the toner image transferred onto the sheet to fix the toner image to the sheet, a conveyance belt configured to convey the sheet from the transfer portion toward the fixing unit, a driving portion configured to drive the conveyance belt, and a controller configured to control the driving portion, wherein the controller is configured to in a case of switching the image forming apparatus to a standby state in which the image forming apparatus is ready to start an image forming operation and stands by for input of an image forming job, execute preheating in which the fixing unit is preliminarily heated, and cause the driving portion to rotate the conveyance belt in a period in which the image forming apparatus stands by in the standby state after the fixing unit has reached a target temperature of the preheating.

According to still another aspect of the invention, an image forming apparatus includes a transfer portion configured to transfer a toner image onto a sheet, a fixing unit configured to heat the toner image transferred onto the sheet to fix the toner image to the sheet, a conveyance belt configured to convey the sheet from the transfer portion toward the fixing unit, a driving portion configured to drive the conveyance belt, and a controller configured to control the driving portion, wherein the controller is configured to in a standby state in which the image forming apparatus is ready to start an image forming operation and stands by for input of an image forming job, execute preheating in which the fixing unit is preliminarily heated, and cause the driving portion to rotate the conveyance belt during a preparation operation after the image forming job is input and before the image forming operation is started.

Further features of the present invention will become apparent from the following description of exemplary embodiments with reference to the attached drawings.

DESCRIPTION OF THE EMBODIMENTS

Embodiments of the present disclosure will be described below with reference to drawings.

First Embodiment

Image Forming Apparatus

Figure 1:
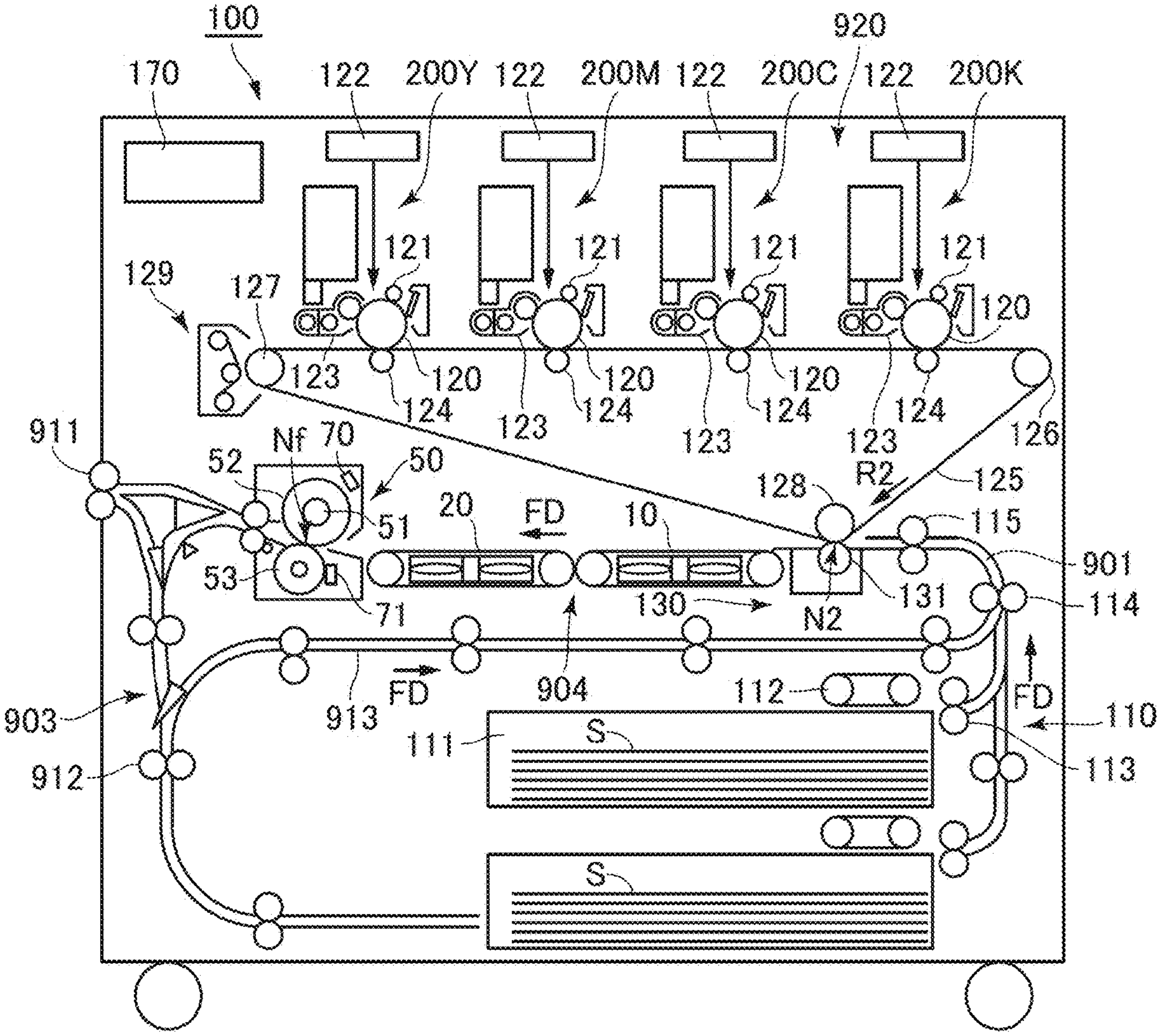
FIG. 1 is a schematic view of an image forming apparatus according to a first embodiment.

FIG. 1 is a schematic view of an image forming apparatus 100 according to a first embodiment. First, an overall configuration of the image forming apparatus 100 will be described with reference to FIG. 1. The image forming apparatus 100 is an electrophotographic printer that forms an image on a sheet S by an electrophotographic process on the basis of image information received from an external device. As the sheet S serving as a recording material, various sheet materials of different sizes and different materials can be used. Examples of the sheet materials include paper sheets such as plain paper sheets and cardboards, plastic films, cloths, surface-treated sheet materials such as coated paper sheets, and sheet materials of irregular shapes such as envelopes and index sheets. In addition, the "image forming apparatus" is not limited to a printer (single-function printer), and may be a copier, a facsimile machine, or a multifunctional apparatus having functions of these.

The image forming apparatus 100 includes a feeding portion 110 that feeds the sheet S, an image forming portion 920 that forms a toner image on the sheet S fed by the feeding portion 110, and a pre-fixing conveyance portion 904 that conveys the sheet S to the fixing unit 50. Further, the image forming apparatus 100 includes the fixing unit 50 that fixes the toner image to the sheet S received from the pre-fixing conveyance portion 904, a post-fixing conveyance portion 903 that conveys the sheet S to which the toner image has been fixed by the fixing unit 50, and a controller 170.

The feeding portion 110 includes a cassette 111 that accommodates sheets, a pickup roller 112 that picks up a sheet from the cassette 111, and a separation unit 113 that, in the case where a plurality of sheets are picked up by the pickup roller 112, separates a sheet from the plurality of sheets and feeds the separated sheet. That is, the feeding portion 110 has a function of feeding a plurality of sheets S set in the cassette 111 serving as an accommodating portion one by one while separating the sheets S from each other. Further, the feeding portion 110 includes a feeding path 901 in which the sheet S separated and fed by the separation unit 113 is conveyed, and send-out rollers 114 and registration rollers 115 that convey the sheet S via the feeding path 901.

The image forming portion 920 is an image forming portion of a tandem type in which stations 200Y, 200M, 200C, and 200K of an electrophotographic system that respectively form toner images of yellow, magenta, cyan, and black are arranged in series. In addition, the image forming portion 920 is an image forming portion of an intermediate transfer system that transfers toner images formed by the stations 200Y to 200K onto the sheet S via an intermediate transfer belt 125 serving as an intermediate transfer member.

The stations 200Y to 200K each have the same configuration except that developers (toners) of different colors are used for development. The stations 200Y to 200K each include a photosensitive drum 120 serving as an image bearing member, a charging unit 121, an exposing unit 122, and a developing unit 123. The photosensitive drum 120 is, for example, constituted by an aluminum base body formed in a drum shape (cylindrical shape) and a layer of organic photoconductor (OPC) serving as an electrophotographic photoconductor formed on the outer peripheral surface of the aluminum body.

The intermediate transfer belt 125 is supported in the state of being stretched over a driving roller 126, a tension roller 127, and a transfer inner roller 128, and is rotated in an arrow R2 direction of FIG. 1 by being driven by the driving roller 126. A cleaning unit 129 includes a cleaning member such as a web that comes into contact with the outer peripheral surface of the intermediate transfer belt 125. In addition, in a space on the inner peripheral side of the intermediate transfer belt 125, primary transfer rollers 124 are disposed at positions respectively opposing the photosensitive drums 120 with the intermediate transfer belt 125 therebetween.

A secondary transfer roller 131 is disposed at a position opposing the transfer inner roller 128 with the intermediate transfer belt 125 therebetween. A secondary transfer nip is formed between the secondary transfer roller 131 and the intermediate transfer belt 125. The secondary transfer nip will be simply referred to as a transfer nip N2. The secondary transfer roller 131, the intermediate transfer belt 125, and the transfer inner roller 128 constitute a secondary transfer portion 130 serving as a transfer portion of the present embodiment.

The pre-fixing conveyance portion 904 is disposed between the secondary transfer portion 130 and the fixing unit 50 in a sheet conveyance direction FD. The sheet conveyance direction FD is a direction following a conveyance path for the sheet S when an image is formed on the sheet S in an image forming operation that will be described below. The pre-fixing conveyance portion 904 of the present embodiment includes a first conveyance unit 10 and a second conveyance unit 20. The configuration of the pre-fixing conveyance portion 904 will be described below.

The fixing unit 50 is a fixing unit (fixing portion) of a thermal fixation system that heats a toner image transferred onto the sheet S to fix the toner image to the sheet S. The fixing unit 50 includes a heating roller 52 serving as a first rotary member, a pressurizing roller 53 serving as a second rotary member disposed to be capable of abutting the heating roller 52, and a heater 51 serving as a heating portion. The heating roller 52 and the pressurizing roller 53 are in pressure contact by a predetermined pressurizing force, and thus a fixing nip Nf is formed between the heating roller 52 and the pressurizing roller 53. For example, the heater 51 is a halogen lamp that is disposed inside the heating roller 52 and heats the heating roller 52 by radiant heat.

The fixing unit 50 includes a cooling portion that cools the pressurizing roller 53. The cooling portion includes a cooling fan, and a cooling duct for uniformly blowing wind from the cooling fan onto the pressurizing roller 53 in the longitudinal direction. Here, the longitudinal direction is a sheet width direction orthogonal to the sheet conveyance direction FD, that is, a main scanning direction of image formation. To maintain high image quality and high productivity, a cooling fan with a large air-blow amount is used. In addition, to suppress variation in the image quality (for example, degree of gloss) depending on the position in the main scanning direction, the cooling duct also has a sufficient size.

In addition, the fixing unit 50 includes a first temperature sensor 70 for detecting the surface temperature of the heating roller 52, and a second temperature sensor 71 for detecting the surface temperature of the pressurizing roller 53. The controller 170 that will be described below performs control to maintain the surface temperatures of the heating roller 52 and the pressurizing roller 53 at appropriate values on the basis of detection signals from the first temperature sensor 70 and the second temperature sensor 71. In addition, the controller 170 performs control to adjust the air-blow amount of the cooling fan to maintain the temperature of the pressurizing roller 53 constant in accordance with the detection signal from the second temperature sensor 71.

The post-fixing conveyance portion 903 includes discharge rollers 911 serving as discharge portions, reverse conveyance rollers 912 serving as reverse conveyance portions, and a duplex conveyance portion 913. The discharge rollers 911 discharge the sheet S discharged from the fixing unit 50 to the outside of the image forming apparatus 100. In the case of duplex printing, the reverse conveyance rollers 912 reverse and convey the sheet S discharged from the fixing unit 50. The duplex conveyance portion 913 conveys the sheet S reversed and conveyed by the reverse conveyance rollers 912 toward the image forming portion 920 again.

In addition, the image forming apparatus 100 includes at least one door (opening/closing door) for removing a jam or for maintenance as an opening/closing member. The door is provided to be openable with respect to the image forming apparatus body so as to expose the sheet conveyance path inside the apparatus. In the case where a conveyance abnormality (sheet jam) of the sheet S has occurred, the user can open the door in accordance with an instruction displayed on an operation portion 210 illustrated in FIG. 3 and remove the sheet S jammed in the apparatus.

To be noted, although an image forming portion 920 of an intermediate transfer system of a tandem type has been described as an example of an image forming portion in the present embodiment, for example, an image forming portion of a direct transfer system that transfers a toner image formed on a photosensitive drum (image bearing member) directly onto a sheet without using an intermediate transfer member may be used. In this case, the transfer portion is constituted by a photosensitive drum, a transfer roller opposing the photosensitive drum, and the like.

In addition, the illustrated configuration of the fixing unit 50 is merely an example, and for example, a belt member stretched over a plurality of rollers may be used instead of the heating roller 52. In addition, as a heating portion, a heating mechanism including a coil and a core for heating the heating roller 52 serving as a first rotary member by induction heating, or a heater board on which a pattern of a heat-generating resistor that generates Joule's heat may be used. Regardless of the heating system of the heater 51 serving as a heating portion, the fixing unit 50 heated by preheating that will be described below emits radiant heat.

Image Forming Operation

Next, a series of operations (image forming operation) in which the image forming apparatus 100 forms an image on the sheet S will be described. When a job (image forming job) of instructing the image forming apparatus 100 to execute the image forming operation is input, the image forming operation is started. Then, in each of the stations 200Y to 200K, the photosensitive drum 120 is rotated, and the charging unit 121 uniformly charges the surface of the photosensitive drum 120. The exposing unit 122 exposes the photosensitive drum 120 on the basis of image information included in the image forming job, and thus forms an electrostatic latent image on the surface of the photosensitive drum 120. The developing unit 123 develops the electrostatic latent image on the photosensitive drum 120 with developer including charged toner, and thus visualizes the electrostatic latent image as a monochromatic toner image.

The monochromatic toner images borne on the surface of the respective photosensitive drums 120 are transferred onto the intermediate transfer belt 125 by the primary transfer rollers 124 through primary transfer. At this time, the monochromatic toner images respectively formed on the surface of the photosensitive drums 120 are transferred onto the intermediate transfer belt 125 so as to be superimposed on one another (superimposed transfer), and thus a full-color toner image is formed on the intermediate transfer belt 125. The full-color toner image will be hereinafter simply referred to as a toner image. To be noted, the intermediate transfer belt 125 is rotationally driven by the driving roller 126 rotating at a constant speed, and thus the peripheral speed of the intermediate transfer belt 125 is maintained at a constant value. The toner image borne on the intermediate transfer belt 125 is conveyed toward the transfer nip N2 by the rotation of the intermediate transfer belt 125.

In parallel with the formation of the toner image described above, the sheets S are fed one by one from the feeding portion 110. The one sheet S fed from the cassette 111 by the pickup roller 112 and separated by the separation unit 113 is conveyed to the registration rollers 115 by the send-out rollers 114. The registration rollers 115 correct the skew of the sheet S, and then conveys the sheet S to the transfer nip N2. At this time, the conveyance timing of the sheet S is adjusted such that entrance of the sheet S to the transfer nip N2 and arrival of the toner image borne on the intermediate transfer belt 125 at the transfer nip N2 are synchronized. Then, while the sheet S passes through the transfer nip N2, the toner image is transferred onto the sheet S from the intermediate transfer belt 125 through second transfer by an electric field formed at the transfer nip N2 by the secondary transfer roller 131.

The sheet S having passed through the transfer nip N2 is conveyed to the fixing unit 50 by the pre-fixing conveyance portion 904. The fixing unit 50 heats and pressurizes the toner image on the sheet S to fix the toner image to the sheet S while nipping and conveying the sheet S at a fixing nip Nf. While the image forming operation is executed, the controller 170 controls the heater 51 on the basis of the detection signal from the first temperature sensor 70 such that the surface temperature of the heating roller 52 is maintained at a target temperature (fixing temperature) suitable for fixing of the toner image.

In the case of forming an image on only one surface of the sheet S, the sheet S sent out from the fixing unit 50 is discharged to the outside of the image forming apparatus 100 by the discharge rollers 911. In the case of forming an image on each surface of the sheet S, the sheet S sent out from the fixing unit 50 is reversed and conveyed by the reverse conveyance rollers 912, and is conveyed to the feeding path 901 again through the duplex conveyance portion 913. Then, the sheet S passes through the transfer nip N2 and the fixing nip Nf again, thus an image is formed on a second surface of the sheet S opposite to a first surface of the sheet S on which an image has been already formed, and then the sheet S is discharged to the outside of the image forming apparatus 100 by the discharge rollers 911.

Pre-Fixing Conveyance Portion

Figure 2:
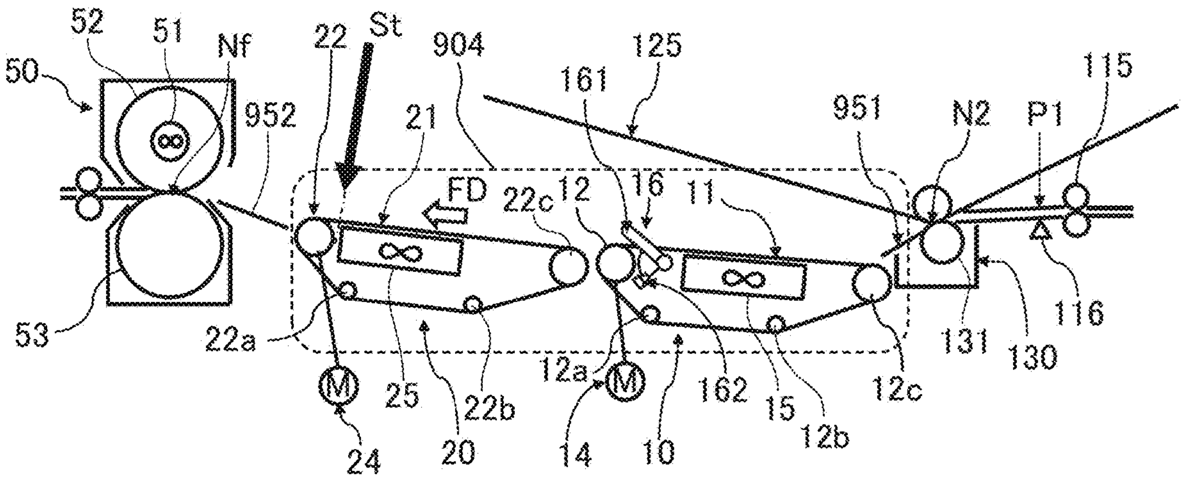
FIG. 2 is a section view of a configuration from a transfer section to a fixing section according to the first embodiment.

Next, the pre-fixing conveyance portion 904 will be described. FIG. 2 is a section view of the secondary transfer portion 130, the pre-fixing conveyance portion 904, and the fixing unit 50. The pre-fixing conveyance portion 904 is a conveyance portion (sheet conveyance mechanism) of the preset embodiment that conveys a sheet from a transfer portion to a fixing unit.

As illustrated in FIG. 2, the pre-fixing conveyance portion 904 includes the first conveyance unit 10 and the second conveyance unit 20. The first conveyance unit 10 and the second conveyance unit 20 are each a conveyance unit capable of conveying the sheet S by itself. In the present embodiment, the first conveyance unit 10 disposed on the upstream side in the sheet conveyance direction FD and the second conveyance unit 20 disposed on the downstream side in the sheet conveyance direction FD are arranged in series. That is, the first conveyance unit 10 is disposed downstream of the transfer nip N2 and upstream of the second conveyance unit 20 in the sheet conveyance direction FD. The second conveyance unit 20 is disposed downstream of the first conveyance unit 10 and upstream of the fixing nip Nf in the sheet conveyance direction FD.

The first conveyance unit 10 includes first conveyance belts 11 serving as conveyance belts, and a plurality of rollers rotatably stretching and supporting the first conveyance belts 11. The first conveyance belts 11 of the present embodiment are stretched over a first driving roller 12 and three driven rollers 12*a*, 12*b*, and 12*c*. In addition, the first conveyance unit 10 includes a first driving motor 14 serving as a driving portion that drives the first conveyance belts 11.

The first driving motor 14 rotationally drives the first driving roller 12, and thus rotates the first conveyance belts 11 in a rotation direction following the sheet conveyance direction FD. The rotation direction is a counterclockwise direction in FIG. 2.

Figure 5A:
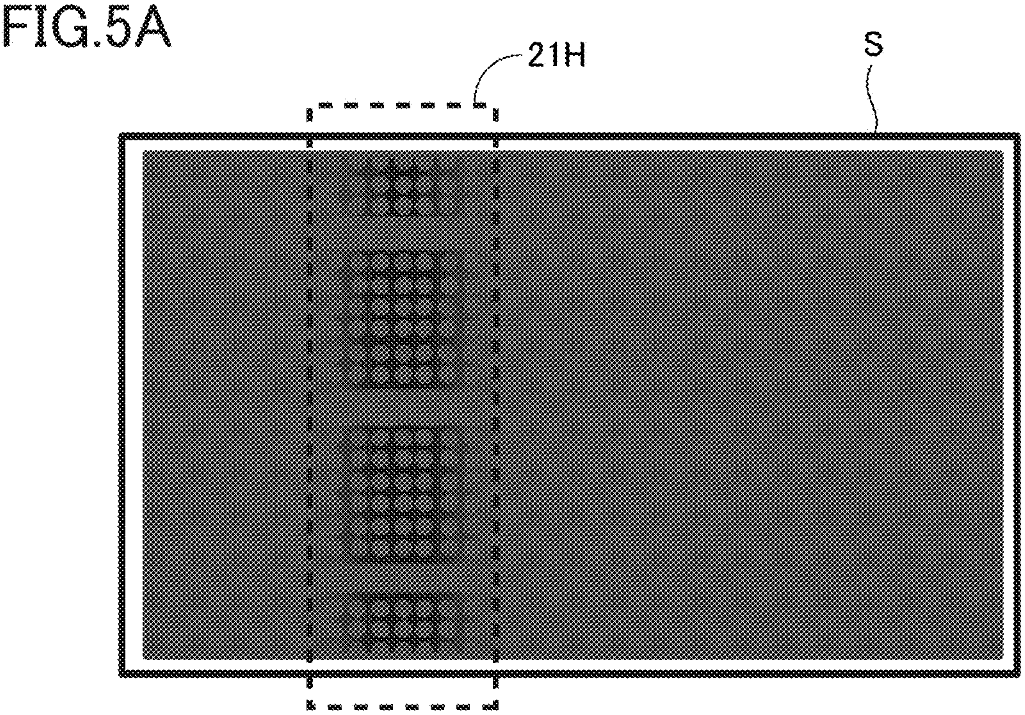
FIG. 5A illustrates an example of gloss unevenness appearing in a product.
Figure 5B:
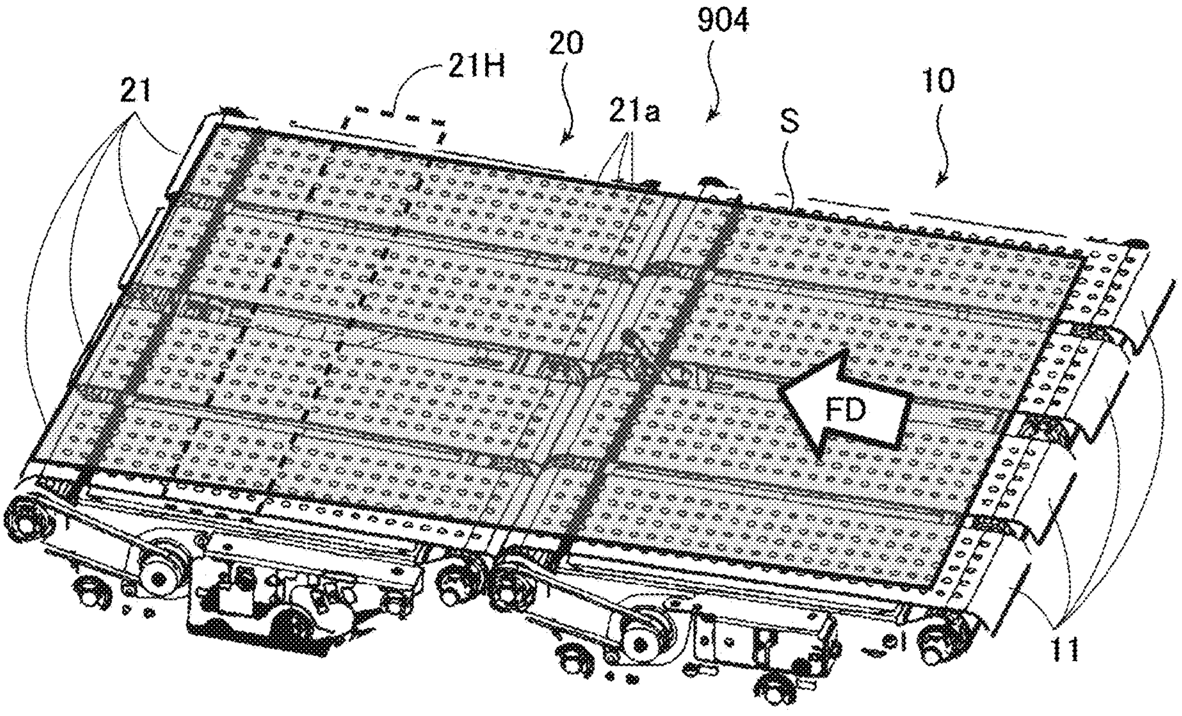
FIG. 5B is a perspective view of a pre-fixing conveyance portion according to the first embodiment.

The first conveyance belts 11 are each an endless belt member in which a plurality of holes penetrating from the outer peripheral surface to the inner peripheral surface are regularly arranged as illustrated in FIG. 5B. That is, the first conveyance belts 11 have breathability (air-permeability) in which air can be passed between the outer peripheral side and the inner peripheral side through the plurality of holes. The first conveyance unit 10 of the present embodiment includes four first conveyance belts 11 arranged in the sheet width direction as illustrated in FIG. 5B.

A first suction fan 15 serving as a suction portion is disposed in a space on the inner peripheral side of the first conveyance belts 11. By sucking air from the outer peripheral side (outside) toward the inner peripheral side (inside) of the first conveyance belts 11 through a large number of holes provided in the first conveyance belts 11, the first suction fan 15 generates a suction attraction force (negative pressure) for holding the sheet S on the outer peripheral surface of the first conveyance belts 11.

The second conveyance unit 20 has substantially the same configuration as the first conveyance unit 10. That is, the second conveyance unit 20 includes second conveyance belts 21 serving as conveyance belts, and a plurality of rollers rotatably stretching and supporting the second conveyance belts 21. The second conveyance belts 21 of the present embodiment are stretched over a second driving roller 22 and three driven rollers 22*a*, 22*b*, and 22*c*. In addition, the second conveyance unit 20 includes a second driving motor 24 serving as a driving portion that drives the second conveyance belts 21. The second driving motor 24 rotationally drives the second driving roller 22, and thus rotates the second conveyance belts 21 in a rotation direction following the sheet conveyance direction FD. The rotation direction is a counterclockwise direction in FIG. 2.

The second conveyance belts 21 are each an endless belt member in which a plurality of holes 21*a* penetrating from the outer peripheral surface to the inner peripheral surface are regularly arranged as illustrated in FIG. 5B. That is, the second conveyance belts 21 have breathability (air-permeability) in which air can be passed between the outer peripheral side and the inner peripheral side through the plurality of holes. The second conveyance unit 20 of the present embodiment includes four second conveyance belts 21 arranged in the sheet width direction as illustrated in FIG. 5B.

A second suction fan 25 serving as a suction portion is disposed in a space on the inner peripheral side of the second conveyance belts 21. By sucking air from the outer peripheral side (outside) toward the inner peripheral side (inside) of the second conveyance belts 21 through a large number of holes provided in the second conveyance belts 21, the second suction fan 25 generates a suction attraction force (negative pressure) for holding the sheet S on the outer peripheral surface of the second conveyance belts 21.

The pre-fixing conveyance portion 904 conveys the sheet S from the transfer nip N2 to the fixing nip Nf while passing the sheet S from the first conveyance unit 10 to the second conveyance unit 20. More specifically, the first conveyance belts 11 of the first conveyance unit 10 convey the sheet S sent out from the transfer nip N2 in the sheet conveyance direction FD by carrying the sheet S on the conveyance surface thereof. The second conveyance belts 21 of the second conveyance unit 20 convey the sheet S received from the first conveyance belts 11 in the sheet conveyance direction FD by carrying the sheet S on the conveyance surface thereof, and thus delivers out the sheet S toward the fixing nip Nf.

To be noted, the center position of the second suction fan 25 in the sheet conveyance direction FD may be positioned downstream of the center position of the second conveyance belts 21 in the sheet conveyance direction FD. In this manner, the sheet S can be conveyed to the fixing nip Nf in a state in which the sheet S is closer to the outer peripheral surface of the second conveyance belts 21.

A sheet detection sensor 116 that detects a sheet is disposed between the registration rollers 115 and the transfer nip N2 in the sheet conveyance direction FD. The sheet detection sensor 116 detects the presence or absence of a sheet at a detection position P1 between the registration rollers 115 and the transfer nip N2 in the sheet conveyance direction FD. A signal output from the sheet detection sensor 116 is transmitted to the controller 170 illustrated in FIG. 3.

A post-transfer guide 951 is disposed between the transfer nip N2 and the first conveyance unit 10 in the sheet conveyance direction FD. The post-transfer guide 951 guides the sheet S sent out from the transfer nip N2 to the conveyance surface of the first conveyance belts 11. The conveyance surface is part of the outer peripheral surface constituting the conveyance path for the sheet S, and corresponds to the upper surface of the first conveyance belts 11 in FIG. 2.

A pre-fixing guide 952 is disposed between the second conveyance unit 20 and the pre-fixing conveyance portion 904 in the sheet conveyance direction FD. The pre-fixing guide 952 guides the sheet S curvature-separated from the conveyance surface of the second conveyance belts 21 to the fixing nip Nf. The conveyance surface is part of the outer peripheral surface constituting the conveyance path for the sheet S, and corresponds to the upper surface of the second conveyance belts 21 in FIG. 2. The sheet S being curvature-separated means that the sheet S is separated from the conveyance surface at a curved portion at a downstream end of the conveyance surface of the conveyance belt due to the stiffness of the sheet S. The curved portion is a portion where the conveyance belt is rolled around the second driving roller 22.

In addition, a loop detection sensor 16 is disposed in the pre-fixing conveyance portion 904. The loop detection sensor 16 detects the height of the sheet S that is being conveyed. The height detected here is the position in a direction orthogonal to the sheet conveyance direction FD and the sheet width direction, that is, the up-down direction in FIG. 2. The loop detection sensor 16 of the present embodiment includes a detection flag 161 that swings in accordance with the height of the sheet S, and a sensor portion 162 that detects the angle of the detection flag 161. The detection flag 161 projects upward from the conveyance surface of the first conveyance belts 11, and swings by coming into contact with the sheet S. For example, the sensor portion 162 is a photo-interrupter that switches between a light-blocked state and a light-transmitted state in accordance with the angle of the detection flag 161, and outputs an ON signal or OFF signal.

Figure 3:
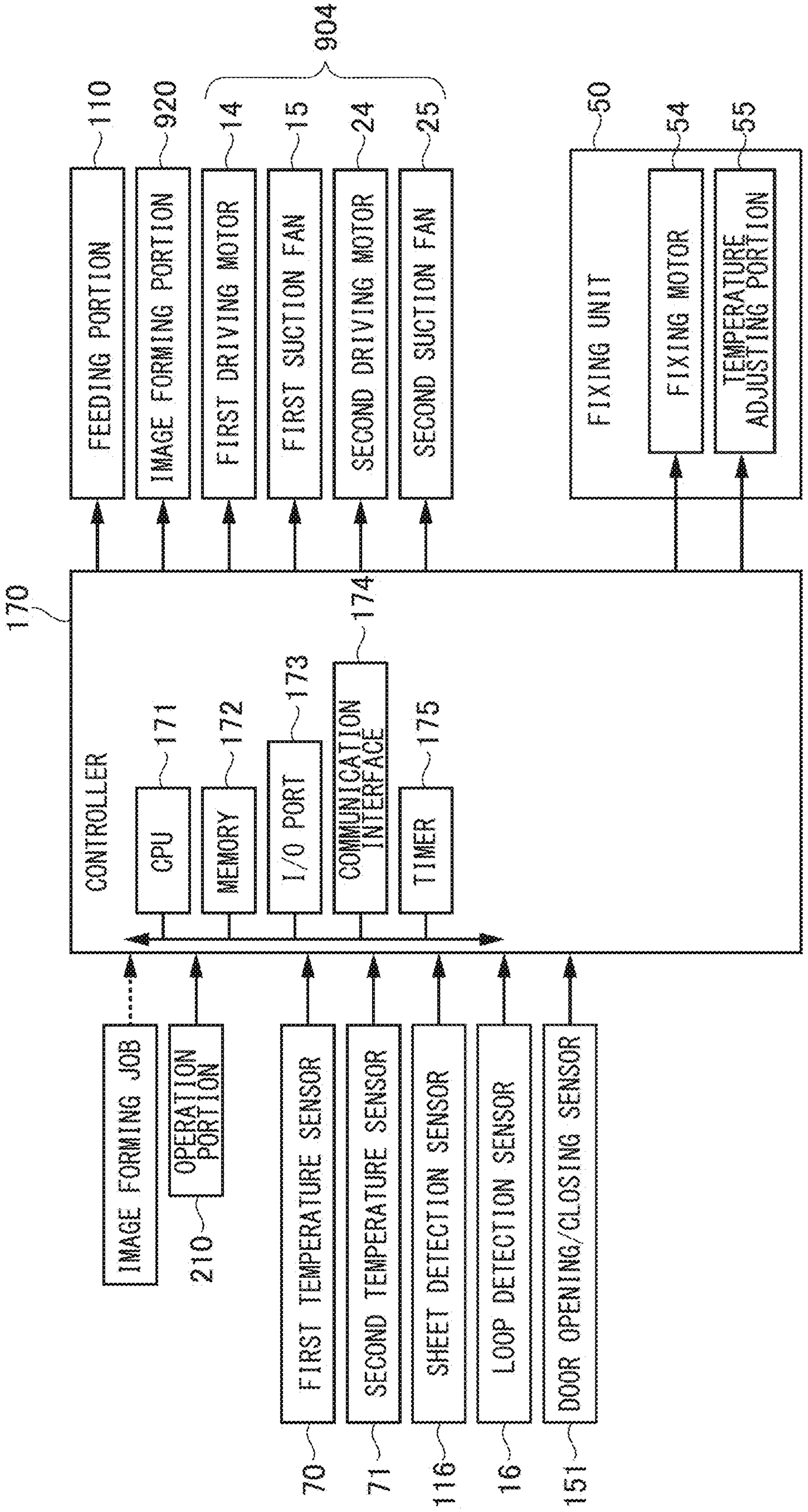
FIG. 3 is a block diagram illustrating a system configuration of the image forming apparatus according to the first embodiment.

The controller 170 illustrated in FIG. 3 adjusts the conveyance speed of the sheet S in the fixing unit 50 on the basis of the detection result of the loop detection sensor 16, and thus controls the degree of warpage (loop amount) of the sheet S between the transfer nip N2 and the fixing nip Nf. Specifically, in the case where the height of the sheet S detected by the detection flag 161 is equal to or larger than a predetermined height, that is, in the case where the loop amount is equal to or smaller than a predetermined amount, the driving speed of the fixing unit 50 by a fixing motor 54 illustrated in FIG. 3 is reduced to increase the loop amount. Conversely, in the case where the height of the sheet S detected by the detection flag 161 is equal to or smaller than a predetermined height, that is, in the case where the loop amount is equal to or larger than a predetermined amount, the driving speed of the fixing unit 50 by the fixing motor 54 is increased to reduce the loop amount. By performing such loop control, the orientation of the sheet S between the transfer nip N2 and the fixing nip Nf can be maintained to be constant.

System Configuration

FIG. 3 is a block diagram illustrating a system configuration of the image forming apparatus 100. The controller 170 serving as a controller that controls the operation of the image forming apparatus 100 includes an arithmetic processing portion including a central processing unit: CPU 171, the memory 172, and the timer 175. In addition, the controller 170 has circuits for communicating data with the outside such as an input/output port: I/O port 173 and a communication interface 174.

The CPU 171 reads out a program stored in the memory 172 and executes the program, and thus controls the operation of the image forming apparatus 100. The memory 172 stores the program and data necessary for executing the program, and provides a work area for the CPU 171 to execute the program. The memory 172 is a computer-readable non-transitory recording medium. In addition, the CPU 171 manages time on the basis of a signal from the timer 175.

The controller 170 grasps the state of the apparatus on the basis of detection results of various sensors such as the door opening/closing sensor 151, the loop detection sensor 16, the sheet detection sensor 116, the first temperature sensor 70, and the second temperature sensor 71. In addition, the controller 170 transmits a command to the control targets of the feeding portion 110, the image forming portion 920, the pre-fixing conveyance portion 904, and the fixing unit 50, and thus controls the operation of each component.

For example, the controller 170 can detect the opening and closing of the door for jam removal or the like on the basis of the detection signal from the door opening/closing sensor 151 serving as an opening/closing sensor. In addition, the controller 170 controls the start/stop and rotation speed of the rotation of the first conveyance belts 11 and the second conveyance belts 21 by transmitting commands to the first driving motor 14 and the second driving motor 24 of the pre-fixing conveyance portion 904. In addition, the controller 170 controls the start/stop of the rotation of and the suction amount of the first suction fan 15 and the second suction fan 25 of the pre-fixing conveyance portion 904 by transmitting commands to the first suction fan 15 and the second suction fan 25. Further, the controller 170 controls the rotation speed (peripheral speed) of the heating roller 52 and the pressurizing roller 53 by a command to the fixing motor 54 of the fixing unit 50, and controls the heat generation amount of the heater 51 by a command to a temperature adjusting portion 55.

In addition, the controller 170 is communicably connected the operation portion 210 serving as a user interface of the image forming apparatus 100. The operation portion 210 includes a display device such as a liquid crystal panel, and an input device such as a touch panel function of the liquid crystal panel or numerical keys. The controller 170 can notify the user of paper jam or the like via the operation portion 210, and receive an instruction from the user such as an instruction for mode selection or input of the material of the sheet.

The controller 170 controls the feeding portion 110, the image forming portion 920, the pre-fixing conveyance portion 904, and the fixing unit 50 in accordance with the image forming job received from an external device, and thus executes the image forming operation. In addition, the controller 170 performs control of preheating that will be described below and idling of the pre-fixing conveyance portion 904 in a state in which the image forming job is not input.

Gloss Unevenness after Preheating

Next, a case where gloss unevenness occurs when the image forming job is input after the image forming apparatus 100 enters the standby state will be described with reference to FIGS. 4 to 5B.

First, the preheating of the fixing unit 50 and local temperature rise of the second conveyance belts 21 occurring after the preheating will be described with reference to FIG. 4. The second conveyance belts 21 will be hereinafter simply referred to as conveyance belts 21. The "preheating" refers to preliminarily heating the fixing unit to a preset temperature in a state before the image forming apparatus receives the image forming job. The preheating is executed in a series of preliminary operations performed for switching the image forming apparatus to the standby state, for example, when the power of the image forming apparatus is turned on or after the door is opened and closed for jam removal. The series of preliminary operations is also called an initial sequence or a preliminary multi-rotation operation.

To be noted, the standby state is a state of the image forming apparatus 100 in which the image forming apparatus 100 is ready to start the image forming operation and stands by for input of the image forming job, and a state of the controller 170 corresponding to this state. In addition, in the initial sequence, in addition to the preheating of the fixing unit 50, the stations 200Y to 200K of the image forming portion 920 are each caused to form a patch image to adjust the density, and/or the photosensitive drums 120 are caused to rotate to clean the surface thereof.

In contrast with the preheating performed in the initial sequence, in a preliminary operation (pre-rotation) in a period from input of the image forming job to actual start of fixing of the toner image, the controller 170 raises the temperature of the fixing unit 50 to a target temperature (fixing temperature) suitable for fixation of the toner image. The target temperature (pre-heating temperature) of the fixing unit 50 in the preheating may be lower than the target temperature (fixing temperature) of heating of the fixing unit 50 for fixing the toner image to the sheet during execution of the image forming job.

After the initial sequence is finished, the controller 170 enters the standby state in which the controller 170 stands by for input of the image forming job in a state in which the image forming operation can be started. In addition, the controller 170 also enters the standby state in the case where the next image forming job is not input when the previous image forming job is finished. To be noted, while the standby state is continued, the controller 170 can control the heat generation of the heater 51 so as to maintain the fixing unit 50 at the pre-heating temperature on the basis of the detection signal from the first temperature sensor 70.

In the standby state, the fixing unit 50 is already heated by the preheating. Therefore, while part of the conveyance belts 21 close to the fixing unit 50 is heated by radiant heat from the fixing unit 50, the temperature of the other part of the conveyance belts 21 gradually becomes closer to the environmental temperature of the environment in which the image forming apparatus 100 is installed. If the standby state continues for a long period, the difference between the surface temperature of the part of the conveyance belts 21 near the fixing unit 50 and the surface temperature of the other parts thereof increases. For example, in some cases, the surface temperature of the part of the conveyance belts 21 near the fixing unit 50 is 60° C. or higher, and the surface temperature at a position far away from the fixing unit 50 is about 30° C.

Figure 4:
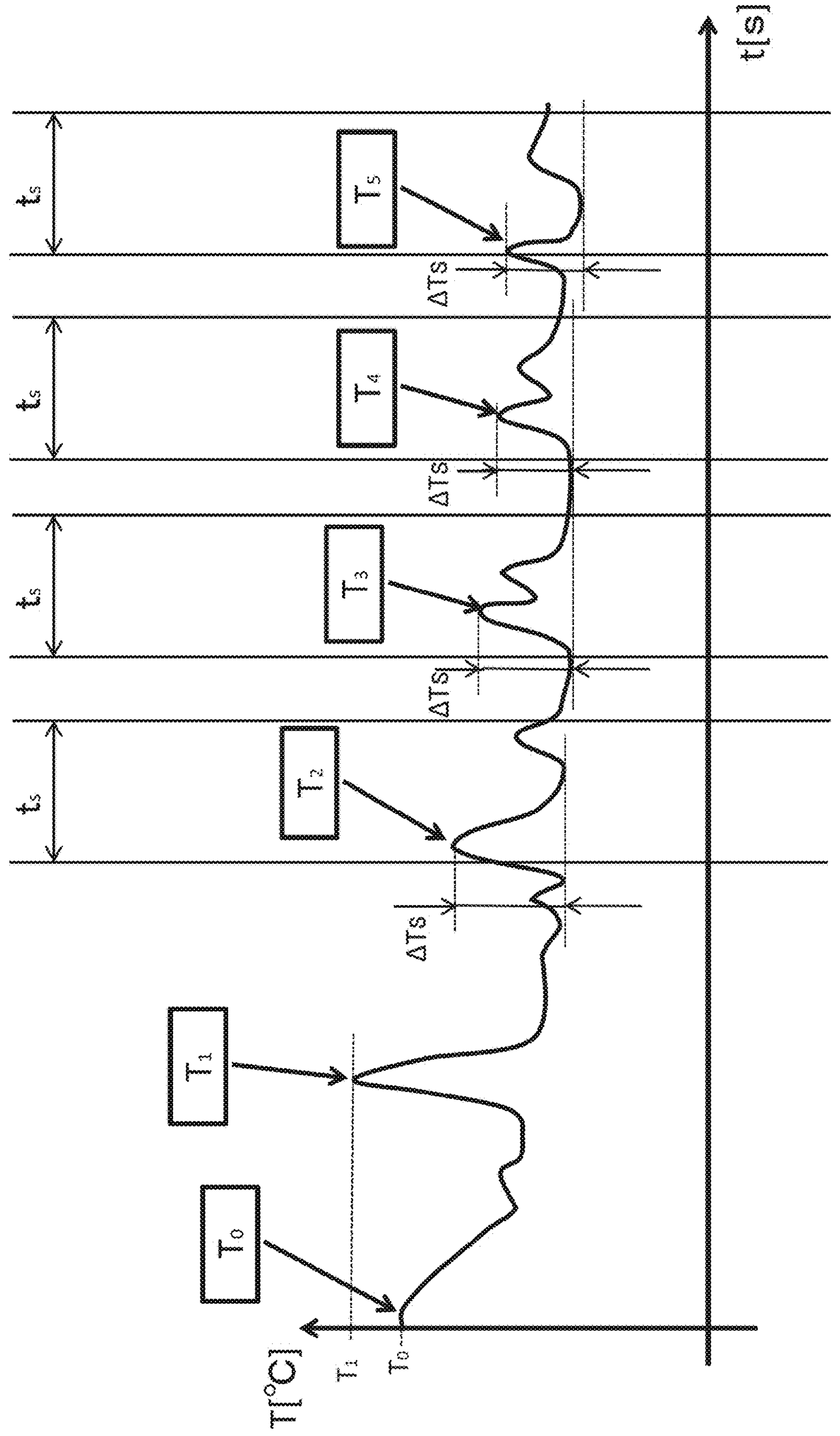
FIG. 4 is a graph illustrating measurement results of the surface temperature of a conveyance belt.

FIG. 4 illustrates results of measurement of the surface temperature of the conveyance belts 21 at a predetermined detection position St illustrated in FIG. 2 by using a surface thermometer in a case where the image forming job is input and driving of the conveyance belts 21 is started after the image forming apparatus 100 has entered the standby state. The horizontal axis t [s] of FIG. 4 represents elapsed time from the start of the job, and the vertical axis T [° C.] represents the measured surface temperature of the conveyance belts 21.

FIG. 4 illustrates measurement results of the case where the driving of the conveyance belts 21 is stopped in the standby state. As described above, as a result of the conveyance belts 21 being driven in a state in which there is difference in the surface temperature in the peripheral direction of the conveyance belts 21 in the standby state, peaks periodically appear in the transition of the surface temperature measured at the detection position St. Here, T0 represents the surface temperature of the conveyance belts 21 at the start of the job, T1 represents the first peak temperature, and Ti (i=2 to 5) represents the second to fifth peak temperatures. ts represents a section in which the sheet S is passing the detection position St, and ΔT represents the difference between the maximum value (peak temperature) and minimum value of the surface temperature while the first sheet S is passing the detection position St.

In such a circumstance, the sheet S conveyed in each section ts is conveyed in a state in which part of the sheet S is in contact with a high-temperature portion of the conveyance belts 21. The toner image in a region where the sheet S has been in contact with the high-temperature portion of the conveyance belts 21 enters the fixing nip Nf in a state of being heated in advance by heat transmitted from the conveyance belts 21, and as a result, has a higher degree of gloss than the toner image in other regions in a state after the fixing. As a result of this, gloss unevenness occurs in a part of the product corresponding to the high-temperature portion of the conveyance belts 21. In other words, in the case where ΔTs is large, gloss unevenness is more likely to occur. In addition, gloss unevenness is more likely to occur in the case where the peak temperature Ti is higher.

FIG. 5A illustrates an example of the gloss unevenness appearing in the product. FIG. 5B is a perspective view of the pre-fixing conveyance portion 904. Here, as a case where the gloss unevenness becomes more likely to be noticeable, a case where a halftone image is formed on the entirety of one surface of the sheet S will be described as an example.

In FIG. 5B, a high-temperature portion 21H of the conveyance belts 21 heated by radiant heat from the fixing unit 50 is indicated by a broken line. In FIG. 5A, the region of the sheet S having been in contact with the high-temperature portion 21H of the conveyance belts 21 is indicated by a broken line. In FIG. 5A, gloss unevenness that is visually recognizable and looks like a trace of the belt is generated in the portion having been in contact with the high-temperature portion 21H of the conveyance belts 21.

As illustrated in FIG. 4, in accordance with the elapse of time after the start of the image forming job, the peak temperature decreases from the peak temperature T2 to the peak temperature T5, and the difference ΔTs between the maximum value and minimum value of the surface temperature in the section is in which the sheet S is conveyed also decreases. Therefore, the gloss unevenness is likely to occur in the product immediately after the start of the image forming job, and the gloss unevenness becomes gradually less noticeable.

Idling of Conveyance Belts

To reduce the possibility of occurrence of the gloss unevenness described above, it is effective to idle the conveyance belts receiving the radiant heat from the fixing unit 50 in at least one of (1) preheating of the fixing unit 50, and (2) standby state of the image forming apparatus 100 after the preheating. That is, it is preferable to rotate the conveyance belts in at least one of the period in which preheating is executed and the period in which the image forming apparatus 100 is standing by in the standby state after the fixing unit has reached the target temperature for the preheating. In the present embodiment, among the two sets of the conveyance belts 11 and 21, the set of conveyance belts closer to the fixing unit 50, that is, the second conveyance belts 21 are idled in both the preheating of the fixing unit 50 and the standby state.

Here, the idling of the conveyance belts refers to rotating the conveyance belts in a non-image forming period. The non-image forming period is a period other than the period (image forming period) in which image formation is performed on the sheet in response to input of the image forming job. The image forming job typically includes a pre-rotation step (preparation operation before image formation), an image forming step, and a post-rotation step (finishing operation after image formation). In the pre-rotation, rising of various voltages used for image formation and the like are performed. In the image forming step, transfer and fixation of an image onto the sheet is performed while conveying the sheet as described above. The non-image forming period includes, in addition to the pre-rotation step and the post-rotation step, periods in which the image forming job is not input such as the standby state and the sleep state, the execution period of the initial sequence after the power is turned on, and the like.

Figure 6:
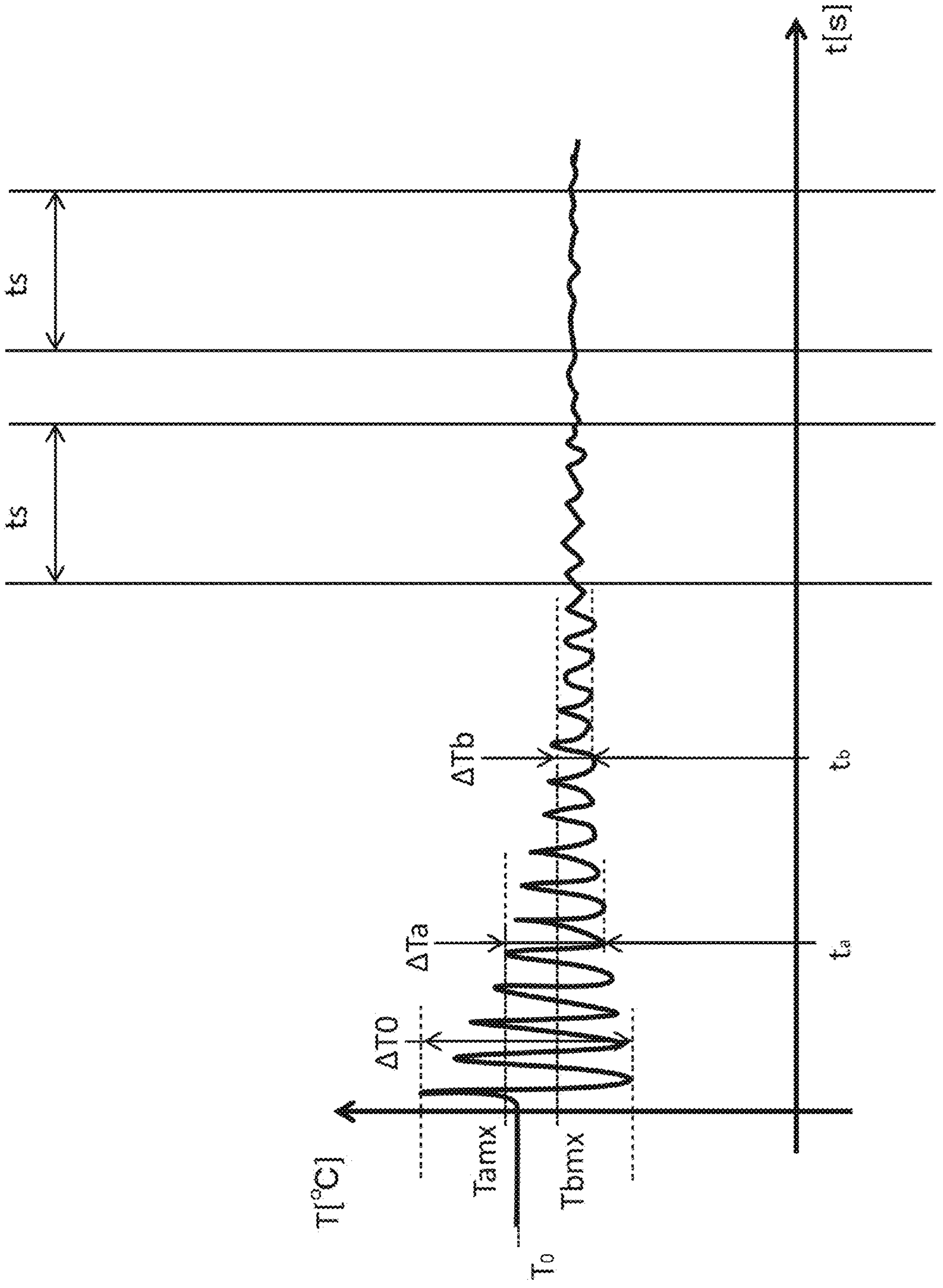
FIG. 6 is a graph illustrating change in the surface temperature of the conveyance belt in a case where the conveyance belt is idled.

FIG. 6 illustrates the transition of the surface temperature of the conveyance belts 21 in the case where the conveyance belts 21 are idled after the preheating. The measurement method for the surface temperature is substantially the same as that described with reference to FIG. 4.

As illustrated in FIG. 6, even in the case where the standby state of the image forming apparatus 100 continues in a state in which the fixing unit 50 is preliminarily heated, the surface temperature of the conveyance belts 21 settles at a certain temperature, and the temperature distribution in the peripheral direction becomes more uniform by idling the conveyance belts 21. That is, the change amount ΔT of the surface temperature in each cycle of rotation of the conveyance belts is the largest (ΔT0) in the first cycle, and then decreases as time passes. That is, ΔT0>ΔTa>ΔTb holds where 0<ta<tb holds. Here, ΔT is the difference between the maximum value and minimum value of the surface temperature of the conveyance belts 21 measured at the detection position St illustrated in FIG. 2 in a period in which the conveyance belts 21 rotate once. In addition, the peak temperature of the surface temperature also decreases as time passes. That is, Tamx>Tbmx holds.

The occurrence of the gloss unevenness caused by the temperature difference in the peripheral direction of the conveyance belts 21 can be reduced as illustrated in FIGS. 5A and 5B if the change amount ΔT of the surface temperature has become sufficiently small (for example, ΔT≤6° C.) before the first sheet S reaches the conveyance belts 21 when the image forming job is executed. In addition, the gloss unevenness is less likely to occur when the peak temperature after the first sheet S has reached the conveyance belts 21 is lower. Therefore, idling of the conveyance belts 21, that is, the rotation of the conveyance belts 21 in the non-image forming period is preferably continued for a predetermined time or longer, for example, 60 seconds or longer.

Flowchart

Figure 7:
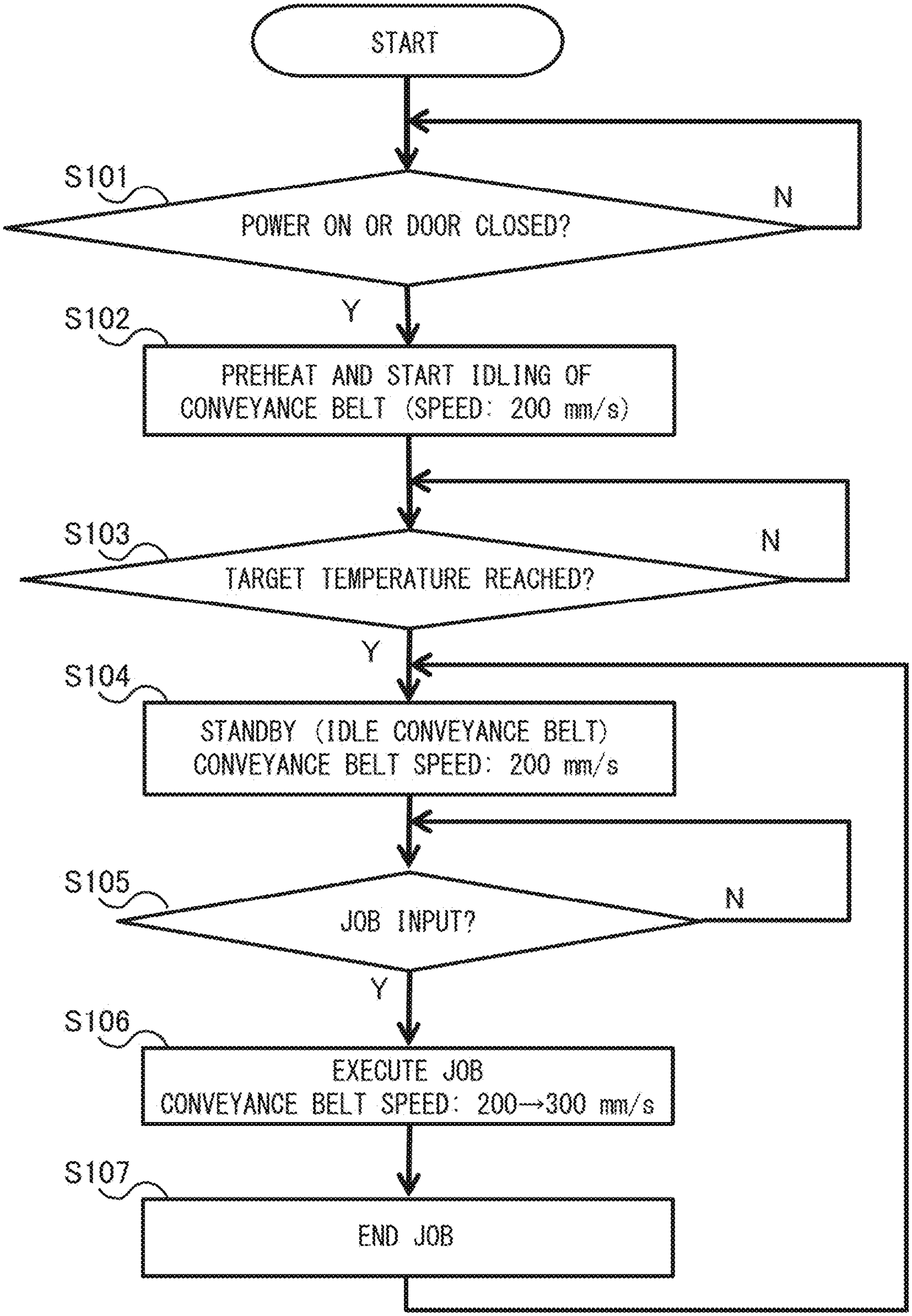
FIG. 7 is a flowchart illustrating a control method according to the first embodiment.

In the present embodiment, in the flowchart illustrated in FIG. 7, idling of the conveyance belts 21 is performed. Each step of the following control is performed by the CPU 171 of the controller 170 illustrated in FIG. 3 executing a program while the power of the image forming apparatus 100 is on.

In the case where the power of the image forming apparatus 100 is turned on, that is, in the case where the result of step S101 is Y, the initial sequence is started and preheating of the fixing unit 50 is executed in step S102. Also in the case where an event indicating that the door of the image forming apparatus 100 has been closed from the open state, that is, door closing is detected, the result of step S101 also becomes Y, the initial sequence is started and preheating of the fixing unit 50 is executed in step S102. In the present embodiment, the conveyance belts 21 are idled while the preheating is executed. That is, the controller 170 rotates the conveyance belts 21 by the second driving motor 24 serving as a driving portion in parallel with power supply to the heater 51 in the fixing unit 50 while the initial sequence is executed.

As described above, by rotating (idling) the conveyance belts 21 while the preheating of the fixing unit 50 is executed, local heating of the conveyance belts 21 by radiant heat from the fixing unit 50 can be reduced.

Here, the conveyance speed (peripheral speed) at the time of idling the conveyance belts 21 does not need to be equal to the conveyance speed (process speed) of the conveyance belts 21 at the time of image formation. In the present embodiment, whereas the conveyance speed of the conveyance belts 21 at the time of image formation is 300 mm/s, the conveyance speed of the conveyance belts 21 at the time of idling is set to 200 mm/s. That is, the peripheral speed of the conveyance belts 21 in the case of rotating the conveyance belts 21 while the preheating is executed is lower than the peripheral speed of the conveyance belts 21 while the image forming operation is executed. As a result of this, occurrence of a noise and decrease in the durability of the driving system caused by the idling of the conveyance belts 21 can be reduced. The driving system mentioned herein includes the second driving motor 24 and a drive transmission path from the second driving motor 24 to the conveyance belts 21.

To be noted, there is a case where, if the conveyance speed is set to a value lower than 200 mm/s, the conveyance speed falls within the resonance range of the second driving motor 24 and the noise and the vibration increases, and therefore the conveyance speed at the time of idling is set to 200 mm/s to avoid the resonance range.

In addition, when idling the conveyance belts 21, the first conveyance belts 11 that are upstream conveyance belts are not idled. As a result of this, occurrence of a noise and decrease in the durability of the driving system caused by the idling of the first conveyance belts 11 can be reduced.

In the case where the fixing unit 50 has reached the target temperature of the preheating and the other steps of the initial sequence are finished, that is, in the case where the result of step S103 is Y, the controller 170 enters the standby state in step S104. Also in the standby state, the idling of the conveyance belts 21 is continued. To be noted, the first conveyance belts 11 serving as upstream conveyance belts are not idled.

As described above, by rotating (idling) the conveyance belts 21 in the standby state, local heating of the conveyance belts 21 by radiant heat from the fixing unit 50 can be reduced.

In the case where the image forming job is input in the standby state, that is, in the case where the result of step S105 is Y, the controller 170 starts execution of the image forming operation. To be noted, in the case where the image forming job is input before the initial sequence is finished, after the initial sequence is finished, the controller 170 starts execution of the image forming job. While the image forming job is executed, before the first sheet S in the job reaches the pre-fixing conveyance portion 904, the conveyance speed of the conveyance belts 21 is increased to the process speed in step S106, and driving of the first conveyance belts 11 is also started.

When the image forming job is finished in step S107, the controller 170 returns to the standby state in step S104, and stands by for input of the next job while idling the conveyance belts 21.

As described above, according to the present embodiment, the conveyance belts 21 are idled in the preheating of the fixing unit 50 and the standby state. As a result of this, occurrence of gloss unevenness caused by the temperature difference of the conveyance belts 21 in the peripheral direction can be reduced.

As a specific case, in the case where the initial sequence is executed after the power of the image forming apparatus 100 is turned on, since the idling of the conveyance belts 21 is performed in parallel with the preheating in the present embodiment, local temperature rise of the conveyance belts 21 can be reduced. As a result of this, occurrence of gloss unevenness in the first job after the power is turned on can be reduced.

As another case, in the case where the previous job is stopped due to a conveyance abnormality, local temperature rise of the conveyance belts 21 can be caused by radiant heat from the fixing unit 50 in a period before jam removal is performed. Also in this case, according to the present embodiment, idling of the conveyance belts 21 is performed in the initial sequence, therefore the temperature difference of the conveyance belts 21 in the peripheral direction can be reduced, and occurrence of gloss unevenness in the first job after the power is turned on can be reduced. Since the initial sequence normally takes 1 minute or longer, the conveyance belts 21 idle for 1 minute or longer after the door closing. Therefore, the temperature difference of the conveyance bels 21 in the peripheral direction can be sufficiently reduced. For example, ΔT can be reduced to 6° C. or less.

As yet another case, in the case where the conveyance belts 21 are stopped in a standby period between the end of the previous job and the input of the next job, local temperature rise of the conveyance belts 21 can be caused by radiant heat from the fixing unit 50. According to the present embodiment, since the conveyance belts 21 are continuously idled in the standby state, occurrence of gloss unevenness in the next job can be reduced.

To be noted, in the case of a recording material having a higher fixing temperature than typical recording materials or the like, the gloss unevenness caused by the temperature difference of the conveyance belts 21 in the peripheral direction can be more likely to be noticeable. For example, in the case of a coated paper sheet or an overhead transparency: OHT (sheet for projectors), gloss unevenness caused by the temperature difference of the conveyance belts 21 in the peripheral direction is easily visually recognizable. According to the present embodiment, occurrence of gloss unevenness can be reduced even in the case of using such a recording material.

Second Embodiment

An image forming apparatus according to another embodiment serving as a second embodiment will be described. In the present embodiment, a mode determining which of the productivity and the image quality is to be prioritized can be selected, and the time (predetermined time) for idling the conveyance belts changes depending on the mode. In addition, in the present embodiment, the configuration of the pre-fixing conveyance portion 904 is different from that of the first embodiment. In the description below, it is assumed that elements denoted by the same reference signs as in the first embodiment have substantially the same configurations and effects as those described in the first embodiment, and elements different from the first embodiment will be described.

Figure 8A:
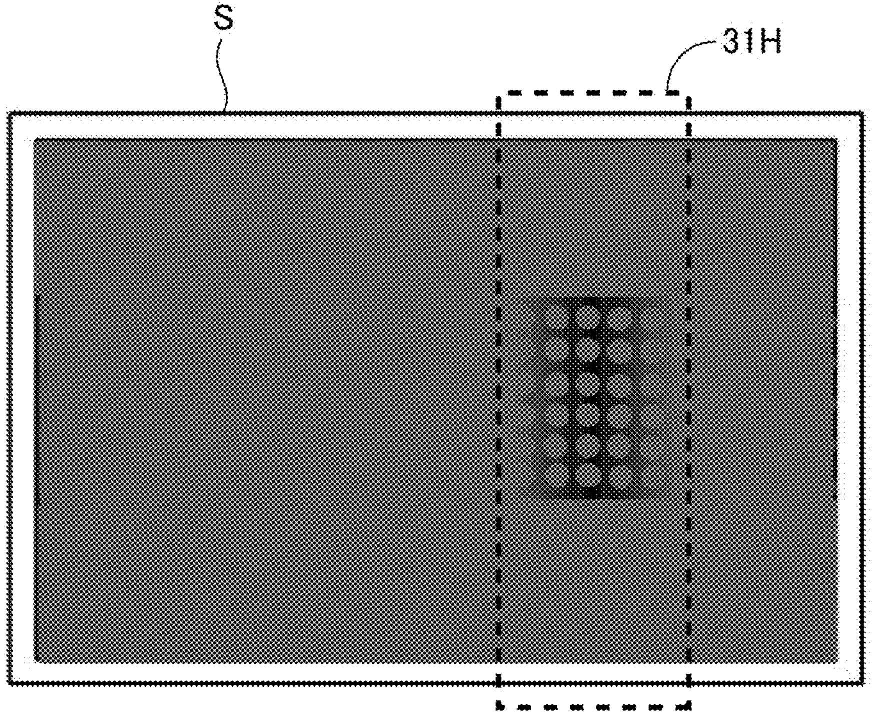
FIG. 8A illustrates an example of glass unevenness appearing in a product.
Figure 8B:
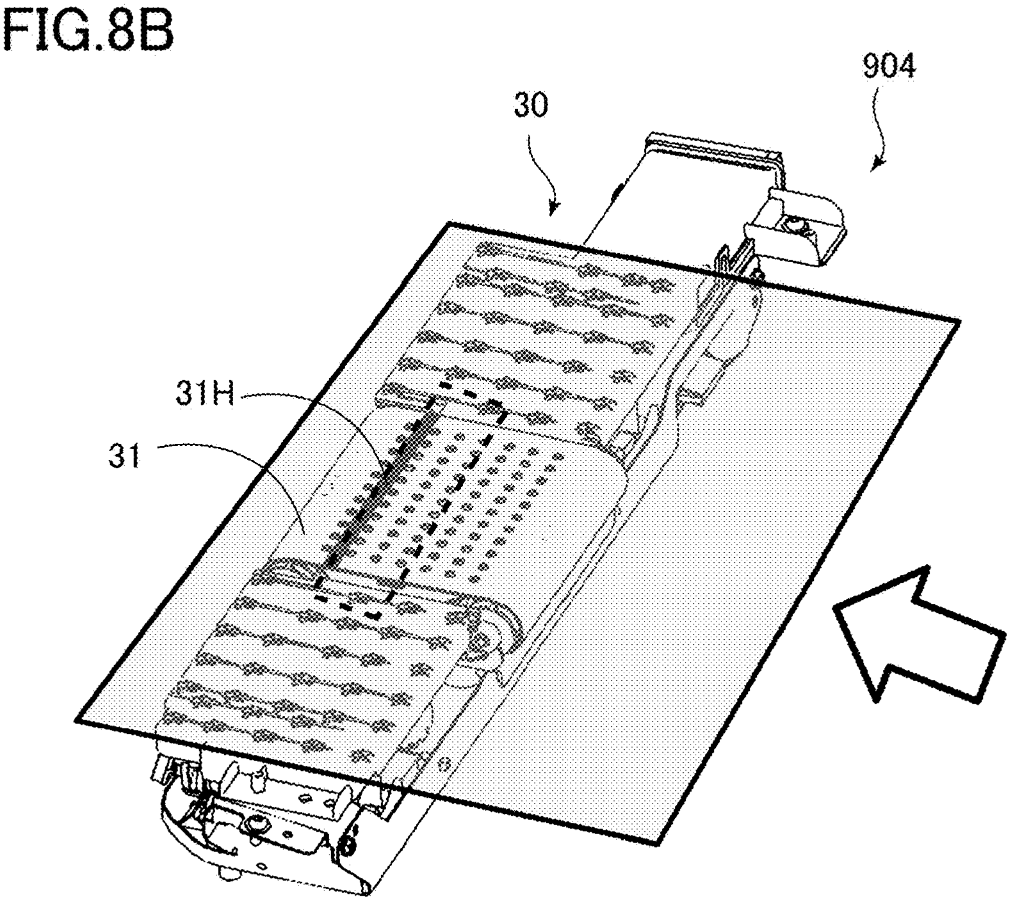
FIG. 8B is a perspective view of a pre-fixing conveyance portion according to a second embodiment.

FIG. 8A illustrates an example of gloss unevenness appearing in the product in the case where the pre-fixing conveyance portion 904 of the present embodiment is used, and FIG. 8B is a perspective view of the pre-fixing conveyance portion 904 according to the present embodiment.

As illustrated in FIG. 8B, the pre-fixing conveyance portion 904 of the present embodiment is constituted by one conveyance unit 30. In addition, the conveyance unit 30 includes only one conveyance belt 31 disposed at the center in the sheet width direction. A plurality of holes are provided in the conveyance belt 31, and the conveyance belt 31 carries and conveys the sheet S by a suction attraction force generated by a suction fan therein.

Also in the case of using the conveyance unit 30 having such a configuration, gloss unevenness can occur in part of the sheet S having been in contact with a high-temperature region 31H of the conveyance belt 31 when the image forming operation is performed in a state in which there is a temperature difference in the conveyance belt 31 in the peripheral direction as illustrated in FIGS. 8A and 8B.

Figure 9:
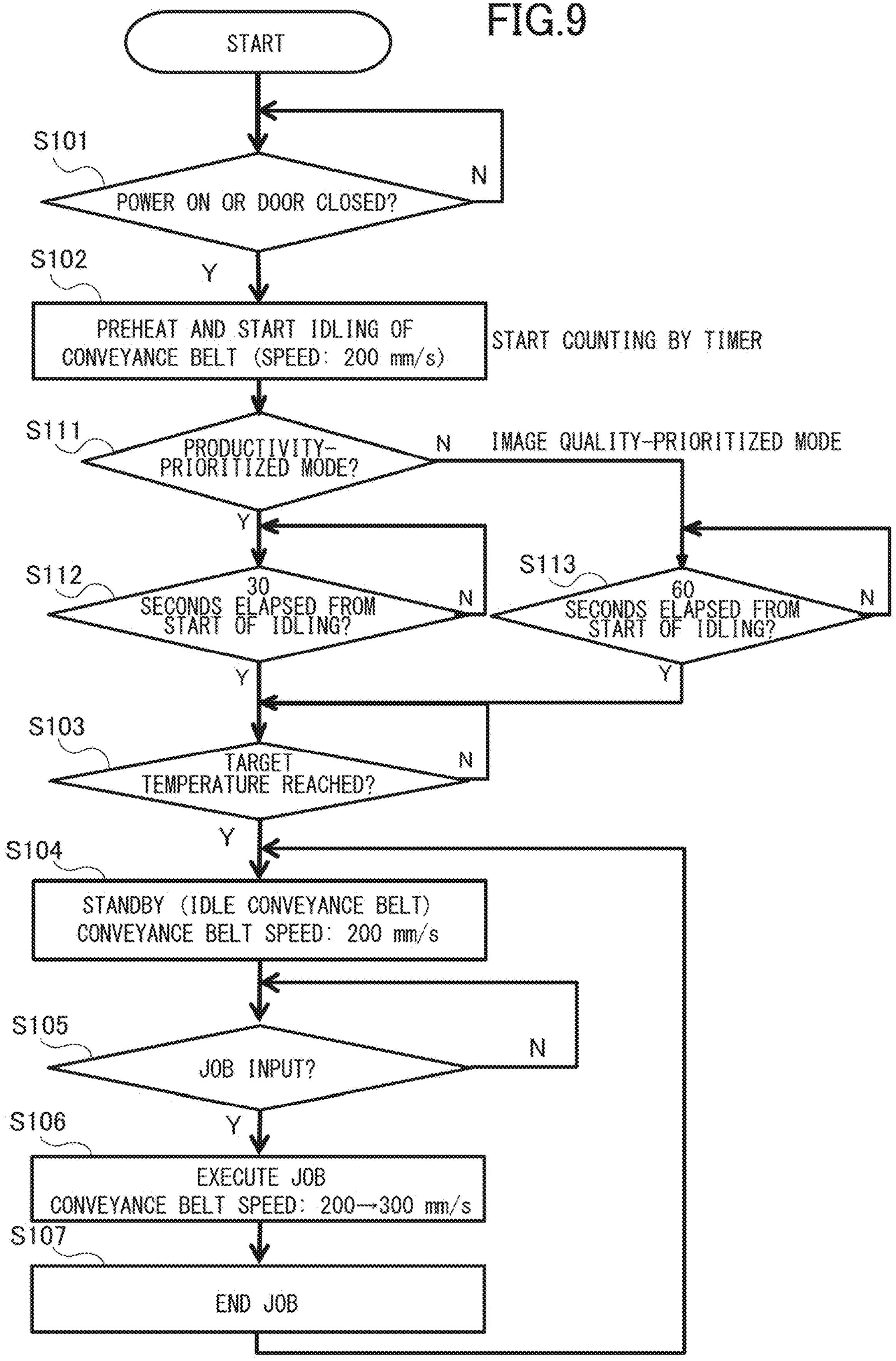
FIG. 9 is a flowchart illustrating a control method according to the second embodiment.

FIG. 9 is a flowchart illustrating a control method of the image forming apparatus according to the present embodiment. The controller 170 of the present embodiment is configured to be capable of selecting a productivity-prioritized mode serving as a first mode in which productivity is prioritized and an image quality-prioritized mode serving as a second mode in which image quality is prioritized as compared with the productivity-prioritized mode while the image forming job is executed. The mode can be switched by, for example, the user operating the operation portion 210 or operating a setting screen of a host computer connected to the image forming apparatus 100.

In the image quality-prioritized mode, output of an image having high gloss is desired. The image quality-prioritized mode is applied to a case of forming an image close to a full-coverage image such as a photograph, or a case of forming an image on a coated paper sheet or the like. In the productivity-prioritized mode, mainly output of a text is desired, and the productivity is more prioritized than the gloss. The image quality-prioritized mode and the productivity-prioritized mode are different in which of the image quality and the productivity is prioritized in the case of a mixed job in which images are successively formed on sheets of a plurality of types having different grammages.

As illustrated in FIG. 9, in the present embodiment, the lower limit of the idling time (rotation time) in the productivity-prioritized mode, which is 30 seconds, is set to be shorter than the lower limit of the idling time (rotation time) in the image quality-prioritized mode, which is 60 seconds, as indicated by steps S111 to S113. That is, in the productivity-prioritized mode, since the conveyance belt 31 is idled for at least 30 seconds in the initial sequence, increase in the FPOT can be suppressed while reducing the gloss unevenness as compared with the case where the conveyance belt 31 is not idled. In contrast, in the image quality-prioritized mode, since the conveyance belt 31 is idled for at least 60 seconds in the initial sequence, the temperature difference of the conveyance belt 31 in the peripheral direction can be further reduced, and the gloss unevenness can be reduced more than in the productivity-prioritized mode.

In FIG. 9, processing other than steps S111 to S113 is substantially the same as in the first embodiment illustrated in FIG. 7.

To be noted, in some cases, the initial sequence takes 60 seconds or longer. Therefore, the initial sequence can finish and the result of step S103 can become Y after the idling is performed for 60 seconds or longer eventually, regardless of which of the productivity-prioritized mode and the image quality-prioritized mode is selected.

Modification Example

Figure 10:
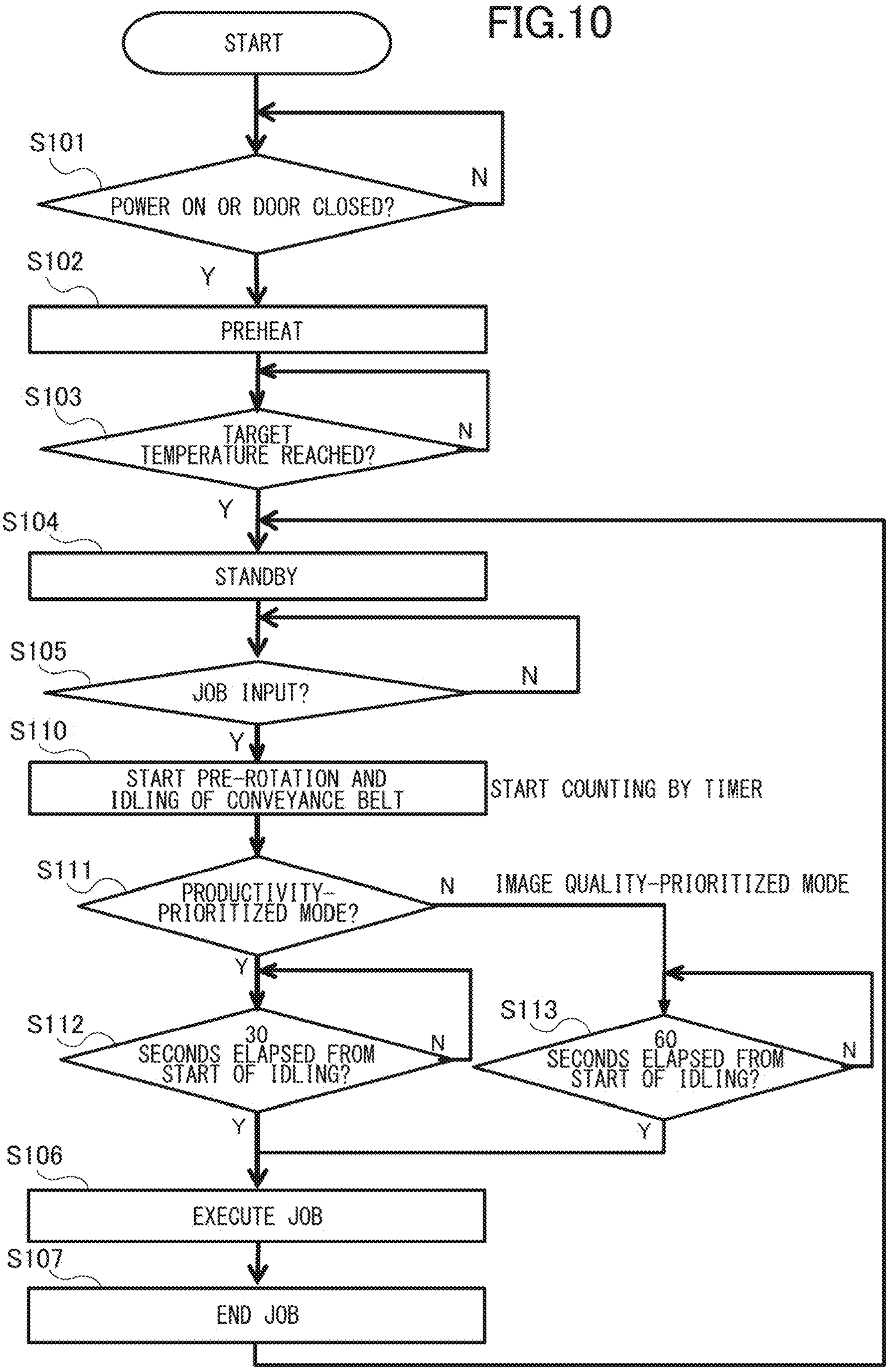
FIG. 10 is a flowchart illustrating a control method according to a modification example.

As a modification example, as illustrated in FIG. 10, the conveyance belt 31 may be idled in step S110 during the preparation operation (pre-rotation) after input of the image forming job. In this case, it is preferable that the idling of the conveyance belt 31 is started at least before the image forming operation is started, that is, at least before the feeding of the first sheet is started, and that the idling time of the conveyance belt 31 in steps S111 to S113 is secured in accordance with which of the productivity-prioritized mode and the image quality-prioritized mode is selected. In the present modification example, a configuration in which the conveyance belt 31 is not idled in the preheating of the fixing unit 50 and in the standby state may be employed.

According to the present modification example, even if there is a temperature difference of the conveyance belt 31 in the peripheral direction at the time of input of the job, since the temperature distribution is gradually uniformized by the idling during pre-rotation, the gloss unevenness can be reduced similarly to the embodiments described above. In addition, by changing the idling time (predetermined time) in accordance with the mode, high productivity and high image quality can be achieved simultaneously.

OTHER EMBODIMENTS

In the embodiments described above, since a configuration in which the sheet S is attracted to the conveyance belt provided with a plurality of holes by the suction attraction force of a suction fan and is thus conveyed has been described as an example, the shape of the holes of the conveyance belt is reflected on the gloss unevenness. However, also in the case where a conveyance belt not having a hole is used, gloss unevenness can occur if there is a temperature difference in the peripheral direction in the conveyance belt due to radiant heat from the fixing unit. Therefore, the present technique is also applicable to an image forming apparatus including a conveyance belt that electrostatically attracts and conveys the sheet S. In addition, the entirety of the conveyance belt does not have to be disposed between the transfer portion and the fixing unit, and the present technique is also applicable to an image forming apparatus including a conveyance belt (transfer belt) extending toward the fixing unit side beyond the transfer portion from the upstream side of the transfer portion.

In the embodiments described above, the air-blow amount of the suction fan may be changed in accordance with the material of the sheet S. For example, in the case of using a recording material having at least a surface formed from a synthetic resin material such as an OHT film, a coated paper sheet, or a synthetic paper sheet, the gloss unevenness is more likely to occur than in a plain paper sheet. Therefore, in the case of using such a recording material, the air-blow amount of the suction fan may be reduced as compared with the case of using a plain paper sheet to suppress temperature reduction at the holes of the conveyance belt. As a result of this, temperature difference between the vicinity of the holes and the other parts in the surface of the conveyance belt can be reduced, and thus occurrence of gloss unevenness can be further reduced.

In the embodiments described above, in the case of entering the standby state, the fixing unit 50 is preliminarily heated and the conveyance belt is idled. In the case of an image forming apparatus having an energy-saving mode in which power consumption is lower than in a normal mode, a configuration in which idling of the conveyance belt is not idled in the energy-saving mode may be employed. In the energy-saving mode, the preheating of the fixing unit 50 is not performed, or at least the target temperature of the preheating is set to be lower than that in the standby state of the normal mode. Therefore, by not idling the conveyance belt, the power consumption can be reduced and the quietness can be improved.

In the embodiments described above, a configuration in which the conveyance belt is continuously idled during the initial sequence and in the standby state has been described as an example. The method for idling the conveyance belt is not limited to this, and for example, idling and temporary stop may be intermittently repeated.

In addition, also a configuration in which, for example, the idling of the conveyance belt is not performed while the temperatures detected by the temperature sensors 70 and 71 of the fixing unit 50 are equal to or lower than predetermined threshold values even in parts of the embodiments described above where the conveyance belt is described to be idled may be employed. This is because local temperature rise of the conveyance belt caused by radiant heat is not likely to occur if the temperature of the fixing unit 50 is not high.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041687, filed on Mar. 16, 2022, which is hereby incorporated by reference herein in its entirety.

What is claimed is:

1. An image forming apparatus comprising:

a transfer portion configured to transfer a toner image onto a sheet;

a fixing unit configured to heat the toner image transferred onto the sheet to fix the toner image to the sheet;

a conveyance belt configured to convey the sheet from the transfer portion toward the fixing unit;

a driving portion configured to drive the conveyance belt; and a controller configured to control the driving portion, wherein the controller is configured to in a case of switching the image forming apparatus to a standby state in which the image forming apparatus is ready to start an image forming operation and stands by for input of an image forming job, execute preheating in which the fixing unit is preliminarily heated, and cause the driving portion to rotate the conveyance belt while the preheating is executed.

2. The image forming apparatus according to claim 1, further comprising:

an upstream conveyance belt disposed upstream of the conveyance belt in a sheet conveyance direction and configured to convey the sheet from the transfer portion to the conveyance belt, wherein, while the preheating is executed, the controller is configured to cause the driving portion to rotate the conveyance belt and not rotate the upstream conveyance belt.

3. The image forming apparatus according to claim 1, wherein a peripheral speed of the conveyance belt in a case where the conveyance belt is rotated while the preheating is executed is lower than the peripheral speed of the conveyance belt while the image forming operation is executed.

4. The image forming apparatus according to claim 1, wherein the controller is configured to cause the driving portion to rotate the conveyance belt in a period in which the image forming apparatus stands by in the standby state after the fixing unit has reached a target temperature of the preheating.

5. The image forming apparatus according to claim 4, further comprising:

an upstream conveyance belt disposed upstream of the conveyance belt in a sheet conveyance direction and configured to convey the sheet from the transfer portion to the conveyance belt, wherein, in the period in which the image forming apparatus stands by in the standby state, the controller is configured to cause the driving portion to rotate the conveyance belt and not rotate the upstream conveyance belt.

6. The image forming apparatus according to claim 4, wherein a peripheral speed of the conveyance belt in a case where the conveyance belt is rotated in the period in which the image forming apparatus stands by in the standby state is lower than the peripheral speed of the conveyance belt while the image forming operation is executed.

7. The image forming apparatus according to claim 1, wherein the controller is configured to cause the driving portion to rotate the conveyance belt in a period in which the image forming apparatus stands by for input of a next image forming job after a previous image forming job is finished.

8. The image forming apparatus according to claim 1, wherein the controller is configured to cause the driving portion to rotate the conveyance belt during a preparation operation after the image forming job is input and before the image forming operation is started.

9. The image forming apparatus according to claim 1, wherein, in a case where rotation of the conveyance belt is started in a non-image forming period, the controller is configured to continue the rotation of the conveyance belt at least until a rotation time of the conveyance belt exceeds a predetermined time.

10. The image forming apparatus according to claim 9, wherein the controller is configured to be switchable to a first mode in which productivity is prioritized and a second mode in which image quality is prioritized, and wherein the predetermined time is shorter in the first mode than in the second mode.

11. The image forming apparatus according to claim 1, wherein the controller is configured to start the preheating in a case where power of the image forming apparatus is turned on.

12. The image forming apparatus according to claim 1, further comprising:

an opening/closing member configured to be opened to expose a sheet conveyance path provided in the image forming apparatus; and an opening/closing sensor configured to detect opening and closing of the opening/closing member, wherein the controller is configured to start the preheating in a case where closing of the opening/closing member from an open state is detected on a basis of a detection signal from the opening/closing sensor.

13. The image forming apparatus according to claim 1, wherein the conveyance belt has a plurality of holes, and wherein the image forming apparatus further includes a suction portion configured to suck air from an outer peripheral side toward an inner peripheral side of the conveyance belt via the plurality of holes such that the sheet is held on a surface of the conveyance belt.

14. The image forming apparatus according to claim 13, wherein the controller is configured to change an air-blow amount of the suction portion in accordance with a material of the sheet.

15. An image forming apparatus comprising:

a transfer portion configured to transfer a toner image onto a sheet;

a fixing unit configured to heat the toner image transferred onto the sheet to fix the toner image to the sheet;

a conveyance belt configured to convey the sheet from the transfer portion toward the fixing unit;

a driving portion configured to drive the conveyance belt; and a controller configured to control the driving portion, wherein the controller is configured to in a case of switching the image forming apparatus to a standby state in which the image forming apparatus is ready to start an image forming operation and stands by for input of an image forming job, execute preheating in which the fixing unit is preliminarily heated, and cause the driving portion to rotate the conveyance belt in a period in which the image forming apparatus stands by in the standby state after the fixing unit has reached a target temperature of the preheating.

16. The image forming apparatus according to claim 15, wherein a peripheral speed of the conveyance belt in a case where the conveyance belt is rotated in the period in which the image forming apparatus stands by in the standby state is lower than the peripheral speed of the conveyance belt while the image forming operation is executed.

17. An image forming apparatus comprising:

a transfer portion configured to transfer a toner image onto a sheet;

a fixing unit configured to heat the toner image transferred onto the sheet to fix the toner image to the sheet;

a conveyance belt configured to convey the sheet from the transfer portion toward the fixing unit;

a driving portion configured to drive the conveyance belt; and a controller configured to control the driving portion, wherein the controller is configured to in a standby state in which the image forming apparatus is ready to start an image forming operation and stands by for input of an image forming job, execute preheating in which the fixing unit is preliminarily heated, and cause the driving portion to rotate the conveyance belt during a preparation operation after the image forming job is input and before the image forming operation is started.

18. The image forming apparatus according to claim 17, wherein a peripheral speed of the conveyance belt in a case where the conveyance belt is rotated in a period in which the image forming apparatus stands by in the standby state is lower than the peripheral speed of the conveyance belt while the image forming operation is executed.

19. The image forming apparatus according to claim 17, wherein, in a case where rotation of the conveyance belt is started in a non-image forming period, the controller is configured to continue the rotation of the conveyance belt at least until a rotation time of the conveyance belt exceeds a predetermined time.

20. The image forming apparatus according to claim 19, wherein the controller is switchable to a first mode in which productivity is prioritized and a second mode in which image quality is prioritized, and
wherein the predetermined time is shorter in the first mode than in the second mode.

* * * * *